United States Patent
Andersson et al.

(10) Patent No.: US 7,023,967 B1
(45) Date of Patent: Apr. 4, 2006

(54) METHOD AND APPARATUS FOR VOICE MAIL SHARING BETWEEN WIRED AND WIRELESS TELEPHONES

(75) Inventors: Hans A. Andersson, Bellevue, WA (US); Edward M. Pallay, Marysville, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 0 days.

(21) Appl. No.: 08/985,122

(22) Filed: Dec. 4, 1997

(51) Int. Cl.
*H04M 1/64* (2006.01)

(52) U.S. Cl. ............... 379/88.12; 379/67.1; 379/88.11; 379/88.22; 379/88.23; 379/88.19; 379/88.25

(58) Field of Classification Search ............... 379/67.1, 379/88.17, 88.18, 201, 207, 210, 214, 45, 379/46, 54, 88.12, 88.25, 88.22, 70, 76, 88.11, 379/88.15, 88.23, 93.03, 93.23, 93.24, 93.25, 379/170, 185, 217, 88.19, 88.2, 88.21; 455/412–416, 455/445, 433
See application file for complete search history.

(56) References Cited

U.S. PATENT DOCUMENTS

| | | | |
|---|---|---|---|
| 4,612,416 A | 9/1986 | Emerson et al. ......... 379/88.18 |
| 4,964,156 A * | 10/1990 | Blair .......................... 379/189 |
| 5,029,199 A | 7/1991 | Jones et al. ............... 379/88.26 |
| 5,105,197 A | 4/1992 | Clagett ........................ 342/419 |
| 5,177,780 A * | 1/1993 | Kasper et al. ............... 455/413 |
| 5,193,110 A | 3/1993 | Jones et al. ............... 379/93.14 |
| 5,195,126 A * | 3/1993 | Carrier et al. ................. 379/45 |
| 5,260,986 A * | 11/1993 | Pershan ...................... 455/413 |
| 5,313,515 A * | 5/1994 | Allen et al. .................. 455/413 |
| 5,327,486 A * | 7/1994 | Wolff et al. ................... 379/96 |
| 5,333,173 A * | 7/1994 | Seazholtz et al. ............. 379/45 |
| 5,361,256 A * | 11/1994 | Doeringer et al. .......... 370/390 |
| 5,428,663 A | 6/1995 | Grimes et al. .............. 340/7.21 |
| 5,450,488 A | 9/1995 | Pugaczewski et al. ..... 379/67.1 |
| 5,467,390 A | 11/1995 | Brankley et al. ........... 379/229 |
| 5,475,735 A | 12/1995 | Williams et al. ............ 455/403 |
| 5,475,737 A | 12/1995 | Garner et al. ............ 379/88.26 |
| 5,475,748 A | 12/1995 | Jones .......................... 379/211 |
| 5,504,804 A | 4/1996 | Widmark et al. ........... 455/414 |
| 5,506,888 A | 4/1996 | Hayes et al. ................. 455/445 |

(Continued)

*Primary Examiner*—Allan Hoosain
(74) *Attorney, Agent, or Firm*—Kenyon & Kenyon LLP

(57) ABSTRACT

A method and system for sharing voice messaging support includes a voice messaging system coupled to a wireless network and wireline network. A given mailbox in the system can be shared between telephones on multiple ones of the networks in question. Once a message is received at the VMS, a message waiting indicator can be sent to the subscriber over both of the networks to which the subscriber subscribes.

28 Claims, 3 Drawing Sheets

U.S. PATENT DOCUMENTS

| | | | |
|---|---|---|---|
| 5,511,111 A | 4/1996 | Serbetcioglu et al. | 379/88.01 |
| 5,528,666 A | 6/1996 | Weigand et al. | 455/412 |
| 5,548,636 A | 8/1996 | Bannister et al. | 379/201 |
| 5,579,379 A | 11/1996 | D'Amico et al. | 379/112 |
| 5,586,177 A | 12/1996 | Farris et al. | 379/230 |
| 5,592,533 A | 1/1997 | McHenry et al. | 455/435 |
| 5,608,786 A * | 3/1997 | Gordon | 379/100 |
| 5,661,781 A * | 8/1997 | DeJager | 379/67 |
| 5,742,905 A * | 4/1998 | Pepe et al. | 455/461 |
| 5,751,707 A * | 5/1998 | Voit et al. | 370/384 |
| 5,802,466 A * | 9/1998 | Gallant et al. | 455/413 |
| 5,963,864 A * | 10/1999 | O'Neil et al. | 455/445 |
| 6,002,750 A * | 12/1999 | Ertz | 379/88.12 |
| 6,006,087 A * | 12/1999 | Amin | 455/413 |
| 6,014,559 A * | 1/2000 | Amin | 455/413 |
| 6,085,101 A * | 7/2000 | Jain et al. | 455/500 |
| 6,215,858 B1 * | 4/2001 | Bartholomew et al. | 379/88.17 |
| 6,233,318 B1 * | 5/2001 | Picard et al. | 379/88.17 |

* cited by examiner

METHOD AND APPARATUS FOR VOICE MAIL SHARING BETWEEN WIRED AND WIRELESS TELEPHONES

BACKGROUND OF THE INVENTION

The present invention is directed to a method and apparatus for providing voice mail sharing between wireless and wired telephones. In particular, the present invention is directed to a method and apparatus for providing voice mail boxes for wired and wireless telephones whereby a single mailbox can be assigned to telephones associated with two different communication systems and a subscriber to the mailbox can be notified of a waiting message over both telephones associated with the mailbox.

Voice mail systems provide advantages in that they allow calling parties and called parties to communicate without establishing a call connection between the two parties. It is well known to provide voice mail capabilities in a wired telephone network. It is also known to provide such capabilities in connection with a wireless telephone network.

FIG. 1 is a block diagram representation of a wireless network in the prior art that provides voice mail services. A wireless telephone 112 communicates with a network 100 via wireless channels associated with base stations 109, 110, and 111. Each such base station is associated with a Mobile Switching Center (MSC) 106, 103, and 101 respectively. These MSCs constitute switching points of the wireless communications network. Each MSC is coupled to a Signal Transfer Point (STP) such as elements 102, 105 and 104. A voice mail system or voice messaging system (VMS) can be coupled to one of the MSCs, here, VMS 108 is coupled to MSC 106.

Also in the network is a home location register (HLR) 107 associated with an MSC, here 106, which keeps track of information regarding the wireless network subscribers. HLRs are well known and store information such as the subscriber's mobile identification number and the registration status of the mobile unit. It also contains information about services to which the mobile subscriber has subscribed. Furthermore, it provides information as to how to route calls to a roaming mobile party.

In the example of the prior art shown, assuming that the mobile unit 112 has associated with it a mailbox at VMS 108, an incoming call to 112 can be directed to the VMS in accordance with the subscriber preferences set forth in the HLR, 107. More particularly, a calling party may be forwarded to the VMS 108 when the mobile unit is turned off or not registered within the service area. In this circumstance, the calling party may leave a message with the voice messaging system in a known manner. The subscriber is subsequently provided with a message waiting indicator that informs the subscriber about the existence of a message in the voice mailbox.

In the past it has been a practice to provide voice messaging systems that were exclusively for either wired telephones or wireless telephones.

It would be advantageous to provide a voice messaging system which was integrated with wired and wireless telephones especially since many subscribers now subscribe to both wired and wireless services. It would also be beneficial to have a common mailbox for a party who subscribes to multiple services.

SUMMARY OF THE INVENTION

The invention provides a method and apparatus for providing integrated voice messaging service to wired and wireless telephones. More particularly, the invention provides a system and method by which a voice messaging system is coupled to both an end office in a wired network and an MSC in a wireless communication system. As a consequence, messages directed to wired telephones or wireless telephones can all be routed to the same VMS.

In addition, in accordance with an embodiment of the present invention, a subscriber who has both wired telephone service and wireless telephone service can be assigned a single mailbox that is associated with both services. Then, when a message is directed to the subscriber over either one of the two services, the message is stored in the voice mail system. Subsequently, the subscriber may be informed of the existence of the message by message waiting indicators provided over both the wireless and the wireline systems.

DETAILED DESCRIPTION

Figure 1:
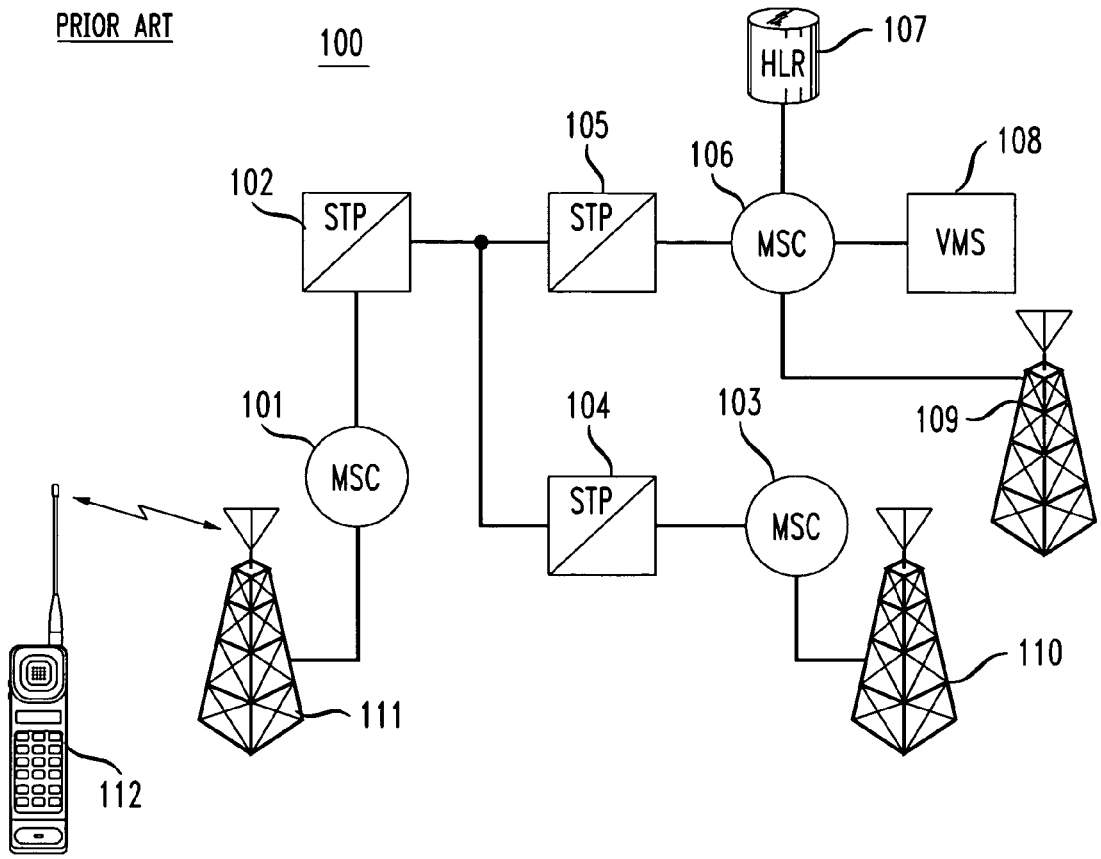
FIG. 1 illustrates a prior art messaging system.
Figure 2:
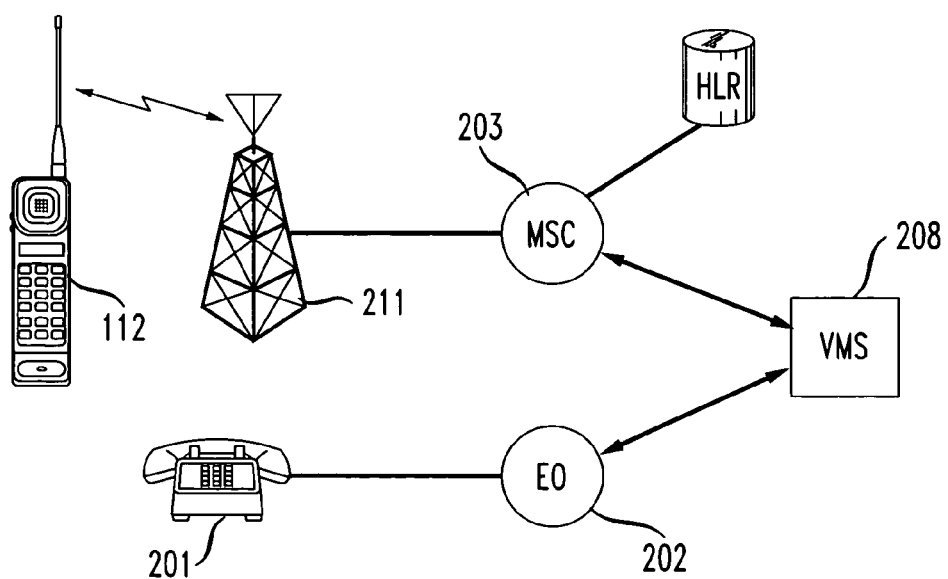
FIG. 2 provides a block diagram illustration of a first embodiment of the present invention.

In accordance with the invention a voice mail or voice messaging system is provided and coupled to two different types of networks. In the embodiment that follows those networks are a wired telephone network and a wireless telephone network. For example, as shown in FIG. 2, a VMS 208 is coupled to a wired telephone network via end office 202 and to a wireless network via mobile switching center (MSC) 203. The end office 202 can conduct wired telephone communications with telephone 201 while MSC 203 can conduct wireless telephone communications with wireless telephone 112 via base station 211. In accordance with the present invention, a given subscriber may subscribe to both the wireless network and to the wired telephone network, so that instruments 112 and 201 could belong to or be associated with the same subscriber.

In accordance with the present invention, the VMS provides a single mailbox for the subscriber which will receive messages directed to either one or both of the telephone instruments 112 and 201. An example of a VMS that can provide this feature is the Octel VMS, known by the trade name as the Sierra, which provides, for a given mailbox, a primary identifier or telephone number and an alias identifier. Thus there are two access points to the mailbox. Further details regarding the coupling of the VMS to the wired and wireless networks will be described below. However, an overview of the operation of the system shown in FIG. 2 will now be provided.

In particular, a call may be directed to the subscriber at telephone 201. The subscriber may subscribe to a voice messaging system such that if the telephone 201 is already busy or does not answer within a prescribed time period, the call is forwarded to the VMS platform. There the calling party will be prompted in the normal fashion to provide a voice mail message. Alternatively, an attempt might be made to contact the subscriber via the wireless network at wireless device 112. Similarly, if the device is not registered, is busy, or does not answer within some predetermined time period, the call may be routed to the VMS mailbox associated with the subscriber. In either instance, once a message is received, the VMS may send out a message waiting indicating signal to a subscriber to notify the subscriber about the existence of a message at the messaging platform. In one embodiment of the invention, the VMS sends such a notification over both networks substantially simultaneously. Alternatively, the protocol for sending notification could be adapted to first send a notification to the subscriber on the network which was originally contacted. That is, if the message at the voice message system had originally been directed to the wired telephone, then the voice mail system might first attempt to contact the subscriber with a message waiting indication signal via the wired telephone system. Then if after some time no response is received, the messaging system could attempt to contact the subscriber via the wireless system. Alternatively, the notification operation could attempt to contact the subscriber at the telephone instrument which was not the subject of the call. For instance, if the message in the mailbox is associated with a call directed to the wired telephone, then the VMS might first attempt to contact the subscriber via the wireless network. In either circumstance, if the first attempt to contact the subscriber is unsuccessful, then the VMS can forward a message waiting indication signal via the second network.

As a result of the configuration of the present invention, the voice mail server will provide integrated voice mail services for two networks of subscribers. The same VMS can provide voice mail service for wireless-only subscribers, voice mail service for local loop-only subscribers and bundled voice mail services for subscribers with both local loop and wireless services.

Further details regarding the coupling of the voice mail system to respective networks will now be provided.

Figure 3:
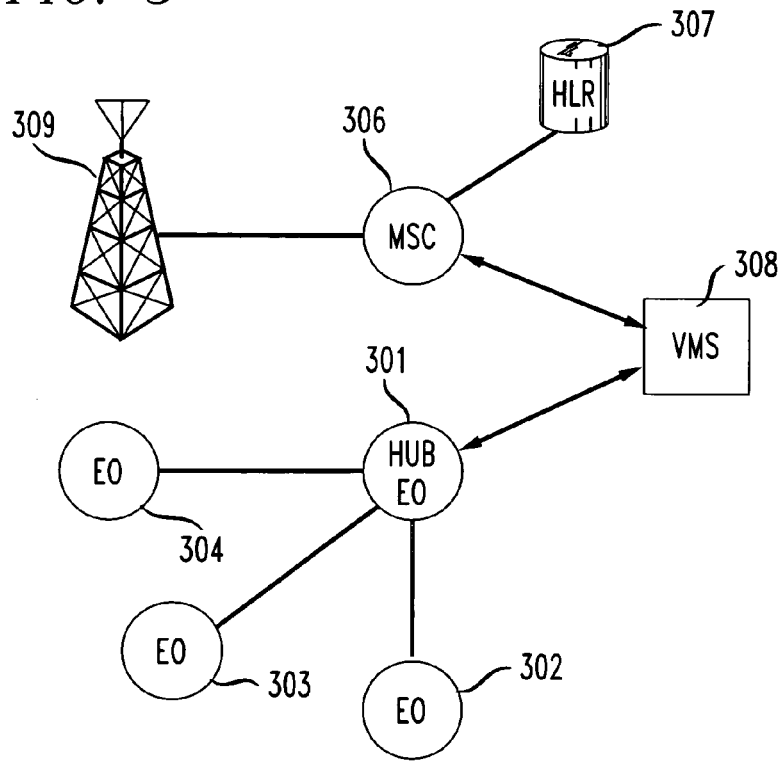
FIG. 3 provides a block diagram illustration of a second embodiment of the present invention.

FIG. 3 will be used to describe two embodiments of coupling the VMS system to both the wireless and the wired network. In FIG. 3, VMS 308 is coupled to the wireless environment by its connection to MSC 306. Base station 309 can be coupled to MSC 306 for providing wireless communications to wireless telephones within a cell or cells associated with the base station. A home location register (HLR) 307 is also associated with the MSC 306 and maintains subscriber information regarding the wireless subscribers and the MSC service area. The connection to the wired network is via a hub end office 301 which can be coupled to a plurality of other end offices 302, 303, and 304. In one coupling configuration, each end office, including the hub end office, is connected to the VMS 308 through multi-line Hunt Group (MLHG) lines with signaling by a simplified message desk (SMDI) data link. Each MLHG line is associated with an SMDI link.

Alternatively, the hub end office can be coupled to the VMS 308 via MLHG lines with SMDI enhanced links. The coupling between the hub end office and other end offices is via ISUP trunks with message-waiting indicators provided on Signaling System 7 (SS7) out of band signals.

As for providing a message waiting indicator to the wire line subscribers, the system does so using the SMDI links.

As for the connection to the wireless subscribers, the interface between the VMS 308 and the MSC 306 can be via ISUP or R1 lines. For wireless subscribers, the system will send a message-waiting indicator to the MSC via the home location register element of the wireless network. The VMS system to HLR interface uses, for example, the Octel Command Language (OCL) protocol over X.25. The HRL sends the message-waiting indicator to the MSC using IS-41 TCAP messages over the SS7 network. The MSC then sends the NWI to the mobile station via the air interface protocol that is appropriate for the particular model of the mobile station, for example, IS-54B or IS-136.

The messaging system must be able to differentiate between the various types of in-coming calls. To do so the VMS may require information such as the calling party number, the forwarding number, and the reason why the call was routed to the messaging system. This call history information can only be passed to the messaging system by using the out-of-band signaling. In both of the embodiments described with respect to FIG. 3, information is passed to the VMS on MLHG lines with SMDI links.

Figure 4:
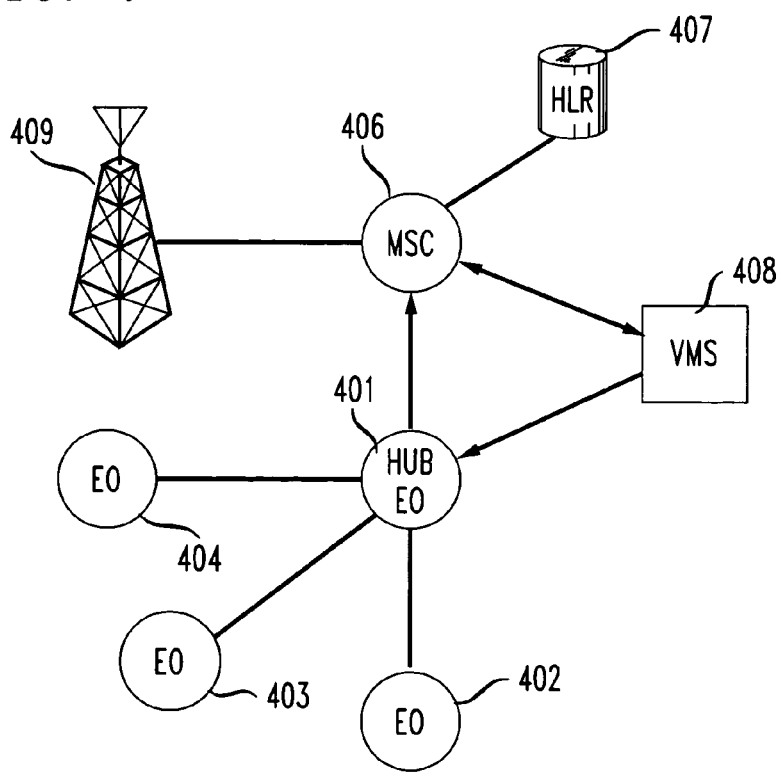
FIG. 4 provides a block diagram representation of a third embodiment of the present invention.

FIG. 4 illustrates another embodiment for coupling the VMS 408 to the wired and wireless telephone systems. In this configuration the VMS acts as an adjunct to the MSC. All in-bound calls to the VMS are received via MSC 406, which is associated with base station 409 and HLR 407. The end offices, for example, 401, 402, 403, and 404 will route calls to the VMS through the MSC. The MSC works like an access tandem switch with protocol interworking between the ISUP links of the end office and ISUP/MF links of the VMS. Outgoing message waiting indicator signals, however, can be provided from the VMS to the end offices using SMDI links or SMDI enhanced links.

Call history information for incoming calls is carried from a remote end office to the MSC through hub end office 401 over the SS7 network and from the MSC to the VMS through the ISUP/MF lines. The message waiting indicator is sent from the VMS to the hub end office via the SMDI enhanced link. If, however, the hub end office determines that the message waiting indicator is needed at a remote end office, that hub end office will reformat the message waiting indicator received from the SMDI link into a T-CAP message and will route that formatted message to the remote end office over the SS7 network. The remote end office maps the SS7 message waiting indicator message to the appropriate subscriber line to indicate message waiting status. This system could be modified in that if SMDI enhanced links are not available then SMDI links to individual end offices could be used to deliver message waiting indicators to those end offices directly without necessarily passing the information through the hub end office.

Thus, the VMS of the described embodiments must provide an interface to both the wired and wireless network. Thus, where for instance, the Octel VMS is used, Octel command language can be utilized to create an appropriate interface to permit coupling to the MSC to provide message waiting indication.

Figure 5:
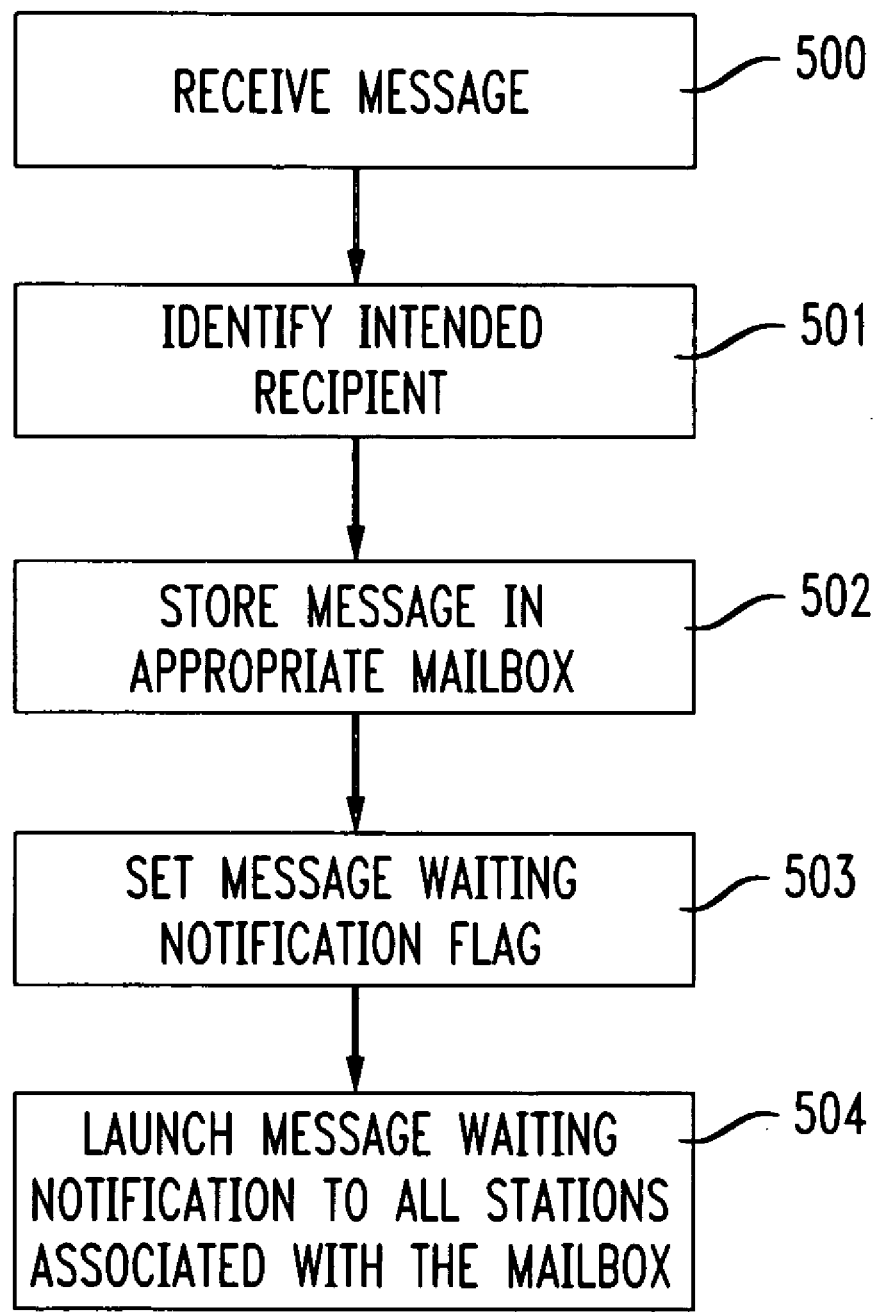
FIG. 5 provides a call processing flow associated with an embodiment of the present invention.

FIG. 5 illustrates a process flow diagram with respect to utilizing the system of the present invention. A message may be received by the VMS from either the wired or wireless network, step 500. The VMS then identifies an intended recipient, step 501. The message is then stored in the appropriate mailbox, step 502. A message waiting notification flag can then be set with respect to that mailbox, step 503. Finally, in one embodiment the system can launch message waiting notifications to all stations associated with the mailbox, step 504. The launching of these notifications can either be substantially simultaneous or could follow one of the notification modes described above, that is, one notification could be sent out on a first network followed by a second notification on a second network at some later time or if some pre-condition is satisfied.

As a result of the construction of the system of the above-described invention, subscribers to a plurality of networks can receive messages regardless of which system device was the originally intended recipient of a message. The configuration also allows the service provider to integrate the provision of services to wireless and wireline subscribers.

What is claimed is:

1. A system for providing voice messaging to a wireless device and a landline communication device, the system comprising:
   a voice mailbox;
   a mobile switching center interface capable of receiving requests to leave messages in the voice mailbox for the wireless device or the landline communication device, wherein the wireless device may be identified by a first telephone number and the landline device may be identified by a second telephone number, and wherein the mobile switching center interface receives call history information associated with the requests; and
   a message waiting indicator coupled to said mobile switching center interface, wherein when a request to leave a message is received at the mobile switching center interface for either the wireless device or the landline communication device, a voice message waiting indication is transmitted to both the wireless device and the landline communication device.

2. The system of claim 1, wherein the message waiting indication is provided to said landline communication device though a hub end office without passing through said mobile switching center.

3. The system of claim 2, wherein the message waiting indication is sent to said hub end office via an SDMI link, and the message waiting indication is sent from said hub end office to the landline communication device through a remote end office over the Signal System 7 network.

4. The system of claim 2, wherein the message waiting indication is provided to the landline communication device using a simplified message desk data link.

5. The system of claim 4 wherein said message waiting indicator causes notifications to be sent to said wireless device and said landline communication device substantially simultaneously.

6. The system of claim 4 wherein said message waiting indicator causes a notification to be first sent to one of said wireless device and said landline communication device and then subsequently causes a notification to be sent to the other one of said wireless device and said landline communication device when a predetermined condition is satisfied.

7. The system of claim 1, wherein all inbound calls to the voice mailbox are received via the mobile switching center interface.

8. A system for providing messaging to a plurality of stations, comprising:
   a mailbox that is associated with a wireless device and a landline communication device;
   a mobile network interface coupled to a first mobile switching center serving said wireless device, said mobile network interface to receive a request through said mobile switching center to leave a message for a landline communication device number, and wherein the mobile network interface is further to receive call history information associated with the requests; and
   a message waiting indicator coupled to said mobile network interface, wherein the message waiting indicator is to transmit a voice message waiting indication to both the wireless device and the landline communication device when a voice message is received for either the wireless device or the landline communication device.

9. The system of claim 8, wherein the message waiting indication is provided to said landline communication device through a hub end office without passing through said mobile switching center.

10. The system of claim 9, wherein the message waiting indication is sent to said hub end office via an SDMI link, and the message waiting indication is sent from said hub end office to the landline communication device through a remote end office over the Signal System 7 network.

11. The system of claim 10, wherein the message waiting indication is provided to the landline communication device using a simplified message desk data link.

12. The system of claim 11 wherein said message waiting indications are sent to said wireless device and said landline communication device substantially simultaneously.

13. The system of claim 8, wherein all inbound calls to the mailbox are received via the mobile switching center.

14. A method comprising:
   receiving a message for a wireless device and for a landline communication device through a mobile switching station, said mobile switching station further receiving call history information associated with the message;
   storing said message for said wireless device and said landline communication device in a telecommunication mailbox, wherein said telecommunication mailbox is associated with said wireless device and said landline communication device; and
   transmitting a voice message waiting indication to said wireless device and said landline communication device.

15. The method of claim 14, wherein the message waiting indication is transmitted to the landline communication device through a hub end office without passing through said mobile switching center.

16. The method of claim 15, wherein the message waiting indication is transmitted to said hub end office via a SDMI link, and the message waiting indication is transmitted from said hub end office to the landline communication device through a remote end office over the Signal System 7 network.

17. The method of claim 16, wherein the message waiting indication is provided to the landline communication device using a simplified message desk data link.

18. The method of claim 17 wherein said message waiting indication is transmitted to said wireless device and said landline communication device substantially simultaneously.

19. An apparatus comprising:
   a means for receiving a message for a wireless device and for a landline communication device through a mobile switching station, said mobile switching station further receiving call history information associated with the message;
   a means for storing said message for said wireless device and said landline communication device in a telecommunication mailbox, wherein said telecommunication mailbox is associated with said wireless device and said landline communication device; and
   a means for transmitting a message waiting indication to said wireless device and said landline communication device.

20. The apparatus of claim 19, wherein the message waiting indication is transmitted to the landline communication device through a hub end office without passing through said mobile switching center.

21. The apparatus of claim 20, wherein the message waiting indication is transmitted to said hub end office via a SDMI link, and the message waiting indication is transmitted from said hub end office to the landline communication device through a remote end office over the Signal System 7 network.

22. The apparatus of claim 21, wherein the message waiting indication is provided to the landline communication device using a simplified message desk data link.

23. The apparatus of claim 22 wherein said message waiting indication is transmitted to said wireless device and said landline communication device substantially simultaneously.

24. A system comprising:
   a mailbox that is associated with a first communication device having a first telephone number and a second communication device having a second telephone number;
   a mobile network interface to receive a request to leave a message, said mobile network interface further to receive call history information associated with the request; and
   a message waiting indicator coupled to said mobile network interface, wherein the message waiting indicator transmits a message waiting indication to both the first communication device and the second communication device when a request to leave a message is received at the mobile network interface.

25. The system of claim 24, wherein the message waiting indication is provided to said first communication device though a hub end office.

26. The system of claim 25, wherein the message waiting indication is sent to said hub end office via an SDMI link, and the message waiting indication is sent from said hub end office to the first communication device through a remote end office over the Signal System 7 network.

27. The system of claim 26, wherein the message waiting indication is provided to the first communication device using a simplified message desk data link.

28. The system of claim 27, wherein said message waiting indications are sent to said first communication device and said second communication device substantially simultaneously.

* * * * *